UNITED STATES PATENT OFFICE.

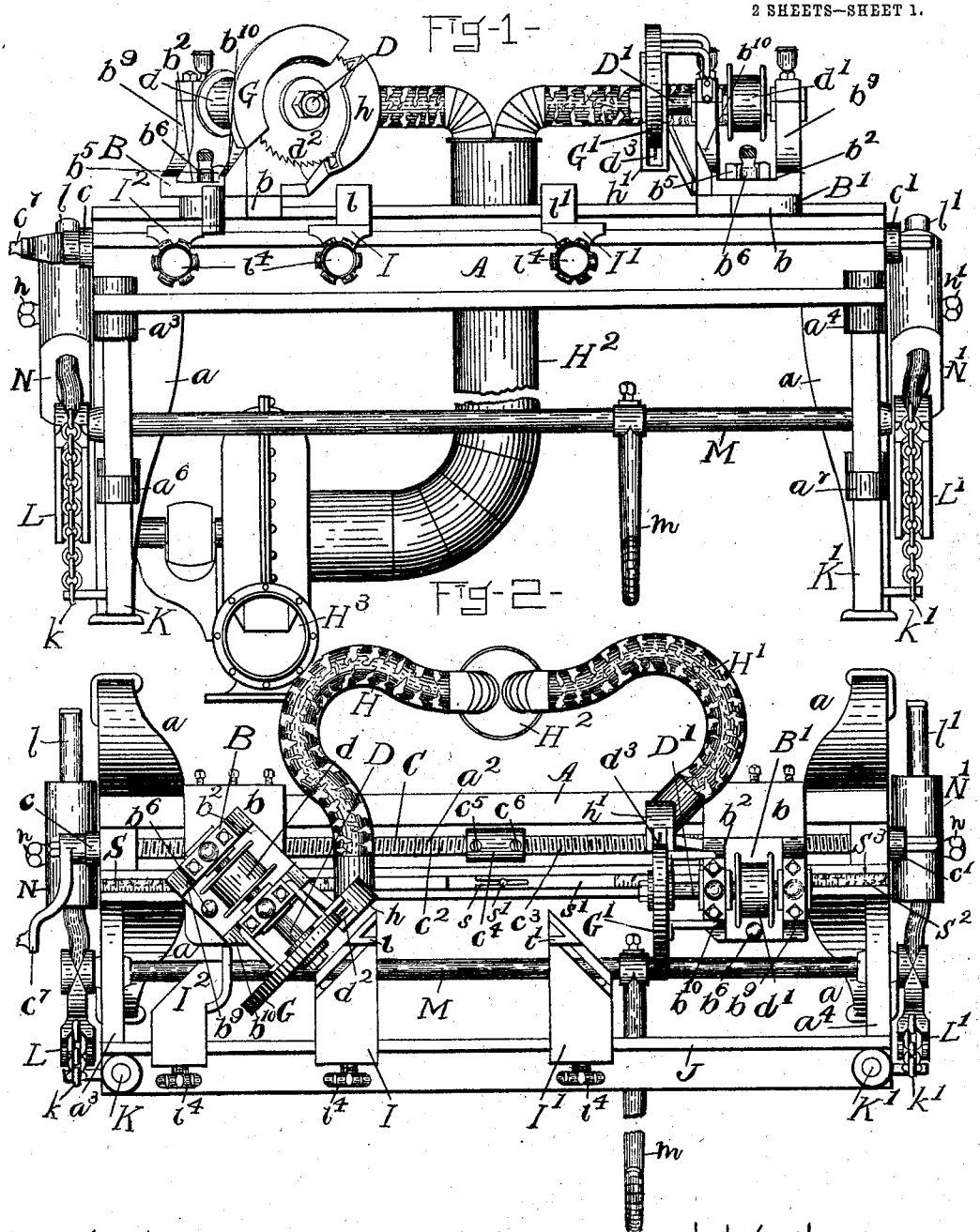

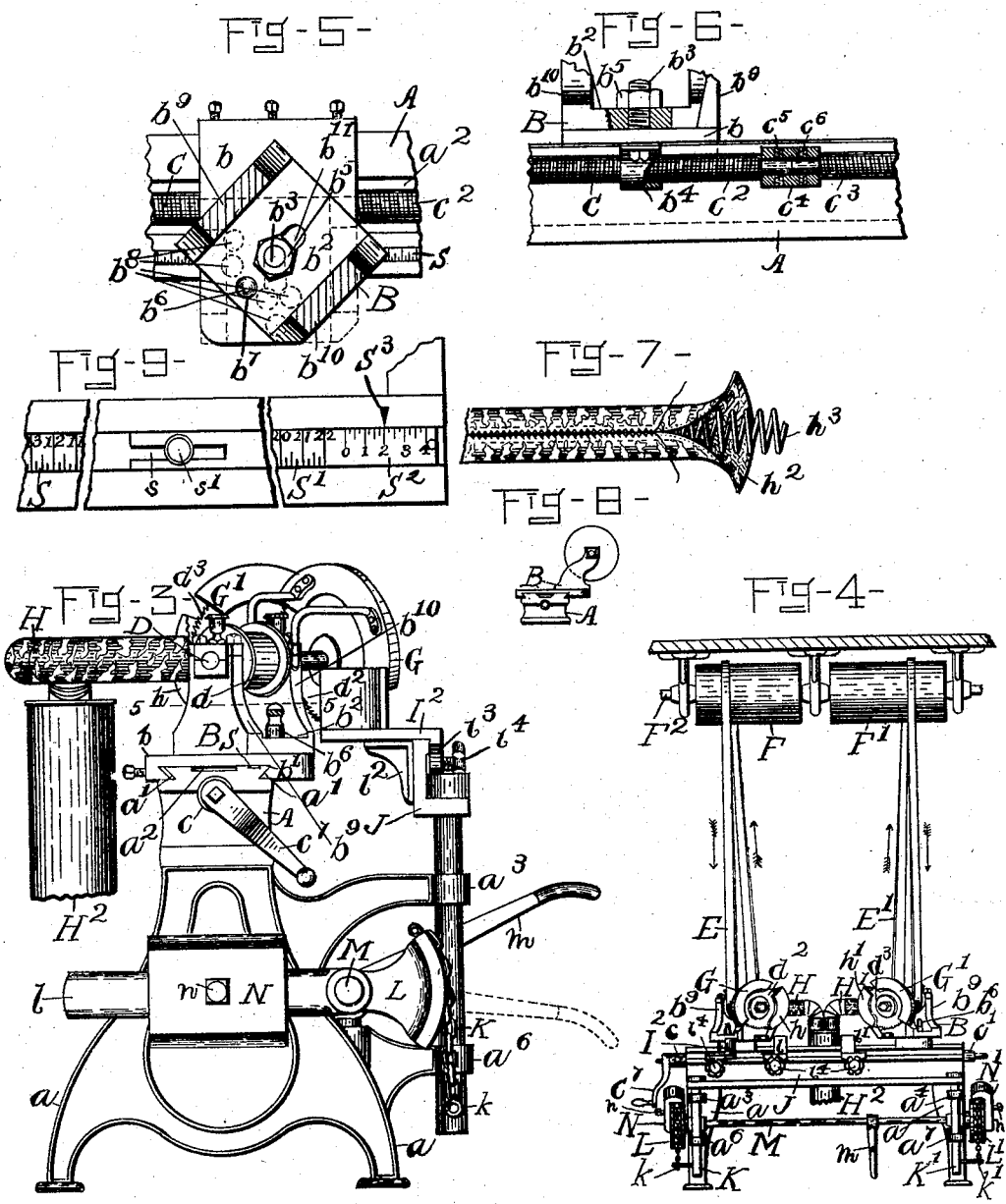

ALBERT CADORETTE AND LOUIS LAFLAMME, OF LOWELL, MASSACHUSETTS.

MITERING AND BEVELING MACHINE.

No. 823,506.        Specification of Letters Patent.        Patented June 19, 1906.

Application filed September 8, 1904. Serial No. 223,747.

*To all whom it may concern:*

Be it known that we, ALBERT CADORETTE and LOUIS LAFLAMME, both citizens of the United States, residing in Lowell, in the county of Middlesex and Commonwealth of Massachusetts, have invented a certain new and useful Improvement in Mitering and Beveling Machines, of which the following is a specification.

This invention relates to mitering and beveling machines adapted to cutting stock for picture-frames, burial-caskets, moldings for panels, cleats for packing-boxes, and similar uses.

Machines heretofore used for the same purpose have usually operated on one end of the stock at a time, requiring two handlings of the stock, and mitering-machines have been adjusted to a properly-cut sample, requiring a loss of time of several minutes (sometimes as many as fifteen minutes) for each adjustment to the different lengths and widths required in the finished piece.

In many classes of stock the longer side of the piece is the standard by which the finished piece must be measured, as in molding for panels and cleats for packing-boxes. In such work the stop-gages against which the pieces are held may be stationary, and we have provided scales by which the heads which carry the saws may be instantly adjusted in mitering to preserve the same length of the longer side of the stock, while varying the width of the stock. We arrange the heads to travel on a suitable bed and use a right and left hand screw by which they may be caused to approach or to recede from each other equally, the heads being at all times at equal distances from the middle of the screw. We provide a scale rigidly secured to the bed of the machine and extending from near the middle thereof outward to or toward one end of said bed parallel to the screw, said scale having numbered divisions which indicate twice the actual length of the spaces on the scale, because when one head moves the other moves an equal distance in the opposite direction, said scale being placed under or in proximity to the corresponding head and being so arranged that the position of a part of the head or of a mark on said head opposite a mark on said scale will indicate the distance apart of the saws when the saws are arranged at right angles to the screw, or, in other words, to the path in which the heads are moved by the screw. Inasmuch as the saws cannot approach each other so closely as to make the cuts formed by them touch, the graduations of the scale do not begin at zero, but only at a number indicating the shortest piece that can be cut on the machine. The figure indicated on this scale expresses in units of measurement adopted (as inches or centimeters) the length of a piece, the ends of which are to cut square or at right angles to the length of the piece.

A second scale which is used primarily to indicate the proposed length of the longer side of a mitered piece—for instance, a cleat for a packing-box head—that will be cut by the saws when the corresponding head is on a numbered division of said last-named scale is divided and numbered in a similar manner to that above described, except that the division-numbers run in the opposite direction from the middle of the machine, the smallest numbered division indicating the shortest piece that can be or is desired to be mitered on said machine. This last-named scale is movable longitudinally on the frame or bed of the machine, and the indications for the purpose above named are correct only when the piece is of a known width and the scale is set by a third scale at a proper distance from the middle of the bed.

There is a third scale and an index or pointer, either of which may be placed upon the bed and the other upon the sliding piece which carries the second scale, this third scale being graduated and numbered in the same manner as the second scale.

When the machine is set to miter a piece of a certain outside length from stock of a certain width, the sliding scale-piece is moved until the pointer and the figure on the third scale, which denotes the width of the stock, are opposite each other, and the heads are then moved until the head over the second or sliding scale is at the mark on said second scale which denotes said outside length.

If the third scale be set at the zero-mark, the figure which the head indicates on the second scale will denote the length of the short side of the mitered piece, because the short side of a piece which has no width or, in other words, is merely a line is of the same length as the long side thereof.

The outside length of the pieces only is important when the pieces when framed together are to fill a given rectangular space, as in the case of moldings of a door-panel; but where the framed pieces are to surround a rectangular space of given size, as in frames for mirrors, pictures, and the like, only the inside length of the pieces is considered. The second and third scales, as above described, are intended for mitering only.

Provision is made for taking away the sawdust by means of an exhaust-fan through a suitable pipe through a hose which is flexible to allow of the variation of the distance between the heads. The saws are driven from an overhead shaft and rotate in a direction to hold the stock against the stop-gages, and means are provided for raising the stock upward against the saws. Means are provided by which the saws may be set at other angles with the axis of the adjusting-screw than forty-five degrees, and the heads are separately adjustable, so that the angles which the two saws make with the axis of the adjusting-saw may be unequal. For instance, one saw may be at right angles with said screw, while the other is at an angle of forty-five degrees to said screw.

Said invention consists in the devices and combinations hereinafter described and claimed.

In the accompanying drawings, on two sheets, Figure 1 is a front elevation of a machine embodying our invention; Fig. 2, a plan of the same; Fig. 3, a left end elevation of the same; Fig. 4, a front elevation of the same belted to driving-drums on an overhead shaft; Fig. 5, a horizontal section of a head on the line 5 5 in Fig. 3, showing a part of the bed in plan; Fig. 6, a front elevation of the right and left hand screw-sections, a vertical longitudinal central section of the coupling which unites said screw-sections, and a front elevation of a part of one of the heads, said head being broken out to show its connection with the screw; Fig. 7, a plan of a part of the suction-hose ripped open to show the construction; Fig. 8, an elevation showing a modification of the head; Fig. 9, a plan of parts of the bed and parts of the scale.

A indicates a bed similar to the bed or shears of a turning-lathe and resting upon legs $a$. The top of the bed is provided with a dovetail $a'$, as shown in Fig. 3, to engage a dovetail groove $b'$, with which the lower ends of the heads B B' are provided. The bed is slotted vertically at the top at $a^2$, as shown in Fig. 2, and an adjusting-screw C is arranged in said slot $a^2$ and journaled in the ends of the bed A and is prevented from moving endwise in said bed by collars $c\ c'$ on said screw outside of said bed. The screw C is made in two equal sections $c^2\ c^3$, one section being left-handed and the other right-handed, and for convenience these sections are separately formed and united by a coupling $c^4$, in which are arranged set-screws $c^5\ c^6$, which turn readily in said coupling and press against said screw-sections. The ends of the screw C are many-sided to receive a crank or wrench $c^7$. Each head B B' consists of a base portion $b$, which contains the groove $b'$ above mentioned, and of an upper part $b^2$, which rests upon said base and is adapted to turn thereon in a horizontal plane, the two being pivoted to each other by a bolt $b^3$, which passes vertically down through both parts of said head and is rigidly secured to a nut $b^4$, which engages one of the screw-sections $c^2\ c^3$.

A nut $b^5$ on the top of the bolt $b^3$ is used to clamp the two parts of the head rigidly together and to prevent the upper part of the head from being accidentally turned on the lower. When the upper part of the head is set at the proper angle, it is further held from turning, as by a pin $b^6$, which passes down through a hole $b^7$ in the upper part of the head and through a hole $b^8$ in the base, several such holes to permit of the head being set at different angles with the base being indicated by dotted circles in Fig. 5.

In the uprights $b^9\ b^{10}$ on each head is journaled a saw-arbor D D', on which is secured the fast pulley $d\ d'$ and a saw $d^2\ d^3$ in any usual manner. Each saw-arbor is driven by a belt E E', which connects its pulley $d\ d'$ to a drum F F' on the counter-shaft F². The drums F F' are long enough to allow the belts to accommodate themselves to the position of the pulley $d\ d'$ and are placed sufficiently above the saw-arbors to make it unnecessary to use intermediate guide-pulleys, and the belts are so arranged that the lower edges of the saw run away from the operator.

The holes by which the swiveling portions of the heads are secured to their bases are made in the form of slots at right angles to the saw-arbors, as shown at $b^{11}$ in Fig. 5, to allow said head portions to be pushed back after being swiveled to bring the saws again into proper position over the work.

Fixed on the upper part of each head and movable therewith is a saw-guard G G' and a case $h\ h'$, which receives the back of the corresponding saw and forms the mouth of a suction-hose H H', the two hose-pipes H H' entering a pipe H², which is exhausted by any usual means, as by a suction-fan H³, to remove the sawdust as soon as formed to any suitable receptacle and to prevent it from mixing with the waste ends of stock which are allowed to fall on the floor or into a suitable receptacle in order that these products may be sold separately, the sawdust for bedding of horses and other purposes and the waste ends for fuels. The hose-pipes H H' are of flexible material, as cloth or leather $h^2$, which is prevented from collapsing by a stout spiral of wire $h^3$ arranged therein, Fig. 7, this construction allowing the hose-pipes to accommodate any movement of the heads.

Raising the stock to the saws allows the waste ends to fall and prevents their being thrown in various directions. The rests I I′ which present the stock to the saws are secured on a horizontal bar J, the latter being supported on two rods K K′, which slide vertically in brackets $a^3$ $a^4$ $a^6$ $a^7$, secured on the frame of the machine, and these rods are connected by chains $k$ $k'$ to sectors L L′, fast on a shaft M, journaled horizontally on said frame. Arms $l$ $l'$, integral with said sectors, extend back of the shaft M and carry weights N N′, adjustable on said arms and retained in place thereon by set-screws $n$ $n'$ to counterbalance or more than counterbalance, as may be desired, the weight of the stock and of the parts supported on said shaft in front of the same. The shaft M is provided with an arm or lever $m$, which extends forward and which being raised causes the rests I I′ to be lifted, raising the stock against the saws.

The rests I I′ or tables are provided with stop-gages $i$ $i'$, against which the stock is placed and which prevents the stock from being carried forward by the saws, so that the action of the saws owing to the direction in which the saws run, as above described, will hold the stock against the gages until the operation is completed. The stop-gages are represented as immovable on the rests I I′.

$I^2$ indicates another stop-gage against which the end of the stock may be placed. The gage $I^2$ and rests I I′ are represented as each having parts $i^2$ $i^3$, which reach down behind and in front of the bar J and as being each held on said bar by a set-screw $i^4$, which turns in the part $i^3$ and thrusts against the front of said bar J in such a manner that on loosening any set-screw $i^4$ the corresponding gage or rest may be adjusted laterally to suit the position and distance apart of the saws.

The distance apart of the saws when these are both at right angles with the screw C or the length of the finished piece with square ends that may be cut with said saws is instantly determined by the position of the outer edge of the base $b$ of the head B, as indicated on the fixed scale S, or by the position of any part of said head which may be predetermined to serve as a pointer or index-finger on said scale S. Said scale S does not, therefore, indicate by its numbers the distance of the corresponding marks from the middle of the screw C or twice that distance, but only the distance between the saws when they are parallel with each other.

Inasmuch as the saws will never be brought close together, it is not necessary that the scale S should be graduated and figured from the zero-point; but said scale may start at such convenient point as will indicate the shortest piece which the machine is desired to cut, and we have represented said scale in Fig. 9 as adapted to measure a piece not less than seven inches long. Said scale S is rigidly secured on the bed parallel with the screw C, with the graduation-mark "7" at such a distance that when the outer side of the corresponding head is at that mark the saws, if at right angles with the screw C, will each be at a distance of three and a half inches from a point directly in front of the middle point of said screw C. From the mark "7" said scale is graduated by marks half an inch apart, but marked "8," "9," "10," &c., successively, because as the heads are moved simultaneously equally toward or away from the middle of the machine by the turning of the screw C it is obvious that if the distance which each head moves is half an inch the distance between the heads will be varied by one inch. The scale S is also marked by smaller subdivisions of the half-inch space to indicate corresponding fractions of an inch in length of the piece to be cut by the machine.

For mitering we use another scale S′, (precisely like the scale S in the length and numbering of its divisions, except that its main divisions are numbered in the opposite direction,) which is capable of endwise movement on the bed A. Said scale S′ is provided with a longitudinal slot $s$, through which a holding-screw $s'$ passes into the bed A, whereby the scale may be adjusted endwise and held at greater or less distance from the middle of the machine. Another scale $S^2$ is marked on the same piece with the scale S′ and is similarly graduated in half inches and fractions thereof, the graduations of the last-named scale $S^2$ being numbered from "0" upward away from the middle of the machine. A stationary index $S^3$ or mark on the bed A points to the graduations on the scale $S^2$. The scales S′ $S^2$ are so arranged with reference to each other and to the rests I I′ that when the saws are in mitering position the position of the head B′ on the scale S′ indicates the length of a line drawn from one saw to the other parallel with the work-engaging faces of the stop-gages $i$ $i'$ of said rests I I′ and at a distance from said work-engaging faces in inches indicated on the scale $S^2$. Hence when the index $S^3$ points to a figure on the scale $S^2$ the scale S′ indicates the length of the longest side of a piece of the width in inches denoted by said figure which would be mitered by the saws in the mitering position they then occupy.

To set the machine for mitering a packing-box cleat of the desired length, it is only necessary to move the scale $S^2$ until the figure thereon which corresponds to the width in inches of the stock is opposite the index $S^3$ and move the heads until the outer bottom edge of the base $b$ of the head B' is on the mark which indicates said length on the scale S'.

If the saws are stationary, an increase or diminution of the width of the stock to be mitered will increase or diminish the length of the long side of the finished piece by twice the variation of the width.

It follows that if the scale $S^2$ be set with its 0-mark at the index $S^3$ the figure indicated on the scale S' will correspond to the length of the short side of the mitered piece, whatever be the width of the stock—that is, said figure will denote the distance between the saws on a straight horizontal line lying in the front or work-engaging faces of the stop-gages $i$ $i'$.

We claim as our invention—

1. The combination of a frame, two heads, two saws, each carried by one of said heads, means for moving said heads simultaneously in opposite directions, equal distances, means for holding said saws at angles to each other and one of said saws at an inclination to the direction of movement of said heads, a scale-piece movable longitudinally on said frame and bearing two scales, a fixed point on said frame arranged and adapted to indicate on one of said scales the width of the stock and the other scale indicating the length of the longest side of said stock when cut in terms of the position of one head.

2. The combination of a frame, two heads, two saws, each carried by one of said heads, means for moving said heads simultaneously, equal distances, in opposite directions, means for holding said saws at angles of forty-five degrees with the direction of movement of said head and at an angle of ninety degrees with each other, an index fixed on said frame and a scale-piece movable longitudinally on said frame and bearing two scales, arranged and adapted, one coöperating with said index to indicate the width of the stock to be cut and the other indicating the length of the longest side of said stock when cut by said saws in terms of the position of one head.

3. The combination of a frame, two heads, two saws, each carried by one of said heads, means of moving said heads simultaneously, equal distances in opposite directions, means for holding said saws at angles of forty-five degrees with the direction of movement of said head and at an angle of ninety degrees with each other, stop-gages arranged with their stop-surfaces parallel with the direction of movement of said head, an index fixed on said frame, a scale-piece movable longitudinally on said frame and bearing two scales, one of which in terms of the position of one head indicates the distance apart of said saws on a line parallel with said stop-surfaces and at a distance from said surfaces indicated by the other of said scales and said index.

In testimony whereof we have affixed our signatures in presence of two witnesses.

ALBERT CADORETTE.
LOUIS LAFLAMME.

Witnesses:
  ALBERT M. MOORE,
  SUMNER B. SHOREY.